United States Patent [19]
Khan et al.

[11] Patent Number: 5,132,922
[45] Date of Patent: Jul. 21, 1992

[54] EMISSIVITY INDEPENDENT MULTIWAVELENGTH PYROMETER

[75] Inventors: Mansoor A. Khan, Grafton; Charly Allemand, Newtonville; Thomas W. Eagar, Belmont, all of Mass.

[73] Assignee: Massachusetts Institute of Technology, Cambridge, Mass.

[21] Appl. No.: 673,261

[22] Filed: Mar. 20, 1991

Related U.S. Application Data

[63] Continuation of Ser. No. 320,888, Mar. 9, 1989, abandoned, which is a continuation-in-part of Ser. No. 296,538, Jan. 12, 1989, abandoned.

[51] Int. Cl.$^5$ .............................................. G01J 5/00
[52] U.S. Cl. .................................... 364/557; 356/43; 374/120
[58] Field of Search ............... 364/550, 556, 557, 578; 356/43, 45; 374/120, 121, 126, 129, 130, 9, 128; 250/338.1, 339, 340

[56] References Cited

U.S. PATENT DOCUMENTS

| | | | |
|---|---|---|---|
| 4,411,519 | 10/1983 | Tagami | 356/406 X |
| 4,652,755 | 3/1987 | Solomon et al. | 250/338.5 X |
| 4,746,798 | 5/1988 | Amon et al. | 250/339 |
| 4,880,314 | 11/1989 | Kienitz | 364/557 X |
| 4,881,823 | 11/1989 | Tanaka et al. | 356/45 X |
| 4,924,478 | 5/1990 | Tank | 364/557 |

OTHER PUBLICATIONS

J. H. Taylor; Planck's radiation law; Feb. 1987.
D. Ya. Svet, *High Temperatue-High Pressure*, 4 (6), Jun. 1972 pp. 715–722.
D. Ya. Svet, *Sov. Phys. Dokl*, 21 (3), Mar. 1976, pp. 162–163.
P. B. Coates, *Metrologia*, 17 (3), Mar. 1981, pp. 103–109.
P. M. Reynolds, Brit. J. Appl. Phys., 15, 1964, pp. 579–589.
J. L. Gardner, *High Temperatures-High Pressures*, 12, Dec. 1980, pp. 699–705.
J. L. Gardner, T. P. Jones, M. R. Davies, *High Temperatures-High Pressures*, 13, Jul. 1981, pp. 459–466.
J. L. Gardner, T. P. Jones, M. R. Davies, *A Broadband Ratiopyrometer*, 5, 1982, pp. 409–412.
G. B. Hunter, C. D. Allemand, T. W. Eagar, *Opt. Eng.*, 24 (6), in press Nov./Dec. 1985, pp. 1081–1085.
G. B. Hunter, C. D. Allemand, T. W. Eagar, *Opt. Eng.*, 25 (11), Nov. 1986, pp. 1222–1231.
J. P. Hiernaut, R. Beukers, W. Heinz, R. Selfsag, M. Hoch, R. W. Ohse, *High Temperatures-High Pressures*, 18, Sep. 1986, pp. 617–625.
J. P. Hiernaut, R. Beukers, M. Hoch, T. Matsui, R. W. Ohse, *High Temperatures-High Pressures*, 18, Sep. 1986, pp. 627–633.
M. A. Khan, *Non-Contact Temperature Measurement*, Sc.D. Thesis, M.I.T., Cambridge, Mass. (Apr. 29, 1988).
D. Ya. Svet, *Independent determination of emissivity from natural thermal radiation spectra*, Sov. Phys. Dokl., vol. 20, No. 3, pp. 214–215 Mar. (1975).
P. R. Bevington, *Data Reduction and Error Analysis for the Physical Sciences*, pp. 134–232, McGraw-Hill, N.Y., 1969.

Primary Examiner—Parshotam S. Lall
Assistant Examiner—M. J. Zanelli
Attorney, Agent, or Firm—Fish & Richardson

[57] ABSTRACT

An apparatus and method for non-contact temperature measurement of an object, using least-squares-based multiwavelength pyrometry techniques. Radiances from an object are detected by a spectrograph/detector apparatus and are converted into electronic signals readable by a computer. The computer then operates on these signals as data to be curve-fit, using least squares analysis, to a predetermined theoretical function for the dependence of the radiance on the wavelength. When the computer has minimized the least-squares difference function, the computer identified a parameter representing the temperature and reports this value to the user, along with a collaterally calculated maximum error in the temperature estimate.

36 Claims, 2 Drawing Sheets

EMISSIVITY INDEPENDENT MULTIWAVELENGTH PYROMETER

The Government has rights in this invention pursuant to Contract Number N00014-80-C-0384 awarded by the Office of Naval Research.

This is a continuation of copending application Ser. No. 07/320,888, filed on Mar. 9, 1989, now abandoned, which is a continuation-in-part of copending application Ser. No. 296,538, filed on Jan. 12, 1989, now abandoned.

BACKGROUND OF THE INVENTION

This invention relates to non-contact temperature pyrometry, and more particularly to least-squares-based multiwavelength pyrometry techniques.

Pyrometric non-contact temperature measurement of high-temperature sources has been known for at least sixty years. Such measurement makes use of the Planck Radiance Formula:

$$N(\lambda) = \epsilon(\lambda) C_1 \lambda^{-5} [\exp/(C_2/\lambda T) - 1]^{-1}$$

where:

N is the spectral radiance emission, $\epsilon(\lambda)$ is the emissivity of the material at wavelength $\lambda$, T is the temperature, and $C_1$ and $C_2$ are Planck radiation constants. Strictly speaking, many pyrometry techniques use the Wien Approximation to the Planck Radiance Formula, which is:

$$N(\lambda) = \epsilon(\lambda) C_1 \lambda^{-5} \exp(-C_2/\lambda T)$$

By measuring the spectral radiance emission, N, at a wavelength $\lambda$, and by supplying the appropriate values for $\epsilon$, $C_1$, and $C_2$, an estimate of the temperature of the source can thus be calculated.

Historically there have been two distinct techniques for such calculations. The older technique is sometimes known as ratio pyrometry. This technique involves measurement of radiance emission at a number of different wavelengths in the attempt to eliminate the emissivity term by making ratios of the measured radiances. The other, newer, method of pyrometry is known as multiwavelength pyrometry. In this method, again, measurements of the spectral radiance emissions of the object are taken at several wavelengths. The processing of this data is then performed by a variety of techniques, the most accurate of which have proven to be least-squares-based multiwavelength techniques. These involve fitting the radiance emission data to an assumed emissivity functional form. Ratio techniques have not, in general, provided adequately accurate temperature estimates for broad industrial usage. The often large inaccuracies of the ratio techniques have been attributed to the fact that they require unrealistic assumptions to be made about the nature of the emissivity, $\epsilon$, in the Planck formula. Ratio techniques assume that both (in the case of two-color) or certain (in the cases of three-color or four-color) of the emissivities at the measured wavelengths be equal. Multiwavelength, particularly a least-squares-based, techniques have been somewhat more successful, largely because they more reasonably assume a wavelength-dependent emissivity function, rather than that all or some of the emissivities are equal. In fact, with certain materials, these techniques have proven to be accurate to within one percent. With other materials, however, results have been unsatisfactory. It has been assumed by previous investigators that the unsatisfactory results have been due to two sources: first, incorrect form or lack of sufficient complexity of the assumed emissivity model function; and second, so-called "correlation effects" due to the inability of curve-fitting routines to distinguish in certain circumstances between changes in emissivity and changes in temperature.

A need has therefore been felt for a method and device which can yield an accurate estimate of the temperature of a source object, along with providing a determination of the largest possible error in the temperature estimate.

SUMMARY OF THE INVENTION

In response to this longfelt need, the applicant has developed an apparatus and method for non-contact temperature measurement of an object, using least-squares-based pyrometry techniques. The invention includes a detector and a computer.

The detector apparatus, in the preferred embodiment, includes a spectrograph which responds to incoming radiances from the object, and separates these incoming radiances into small wavelength bands. These bands are then converted into electronic radiance signals by photosensitive devices, one for each wavelength band. The photosensitive devices provide electronic radiance signals of strength corresponding to the intensity of the incoming radiances at their respective wavelength bands. In this embodiment, the spectrograph is internally calibrated to scatter or eliminate undesirable or extraneous incoming radiances.

In another embodiment, a baffle and filter apparatus, operatively connected to the spectrograph, is required to eliminate detection of undesirable stray light and undesirable wavelengths of light from the object.

The computer responds to the electronic radiance signals generated by the photosensitive devices of the spectrograph. The computer operates on the raw data (i.e. the electronic radiance signals), along with a predetermined emissivity model function, to generate an estimated value of the temperature of the object, along with an estimate of the largest possible error in the value for the temperature. In one embodiment, the emissivity model function is input directly by the user. In another embodiment, the emissivity model function is selected by the user from a bank of potential emissivity model functions included within the computer. In yet another embodiment, the computer itself selects the appropriate emissivity model function from a bank of potential emissivity model functions. The emissivity model function is a function which models the wavelength dependence of the emissivity for the material from which the object is made. The computer is adapted to first multiply the chosen emissivity model function by the Plank Radiance Formula (or the Wien Approximation thereto, in the case of linear techniques) in order to generate a radiance/wavelength function. This radiance/wavelength function constitutes a model for the theoretical dependence of the incoming radiance on the wavelength of detection. The computer then curve-fits the data (i.e. the electronic radiance signals) with the theoretical model, radiance/wavelength function. The object is to minimize the difference between the respective radiance values predicted by the radiance/wavelength function and those detected electronic radiance signals incoming from the object. The computer is adapted to generate a least-squares difference function, which is related to the difference between the detected electronic radiance signals and the respective radiance values predicted by the radiance/wavelength function. The computer is then programmed to minimize this difference function by finding values for the unknown parameters in the radiance/wavelength function which provide a minimum for the difference function. The computer is then programmed to identify an estimated value of the temperature from a preselected one of the unknown parameters of the radiance wavelength function. Lastly, the computer is programmed to calculate an estimate of the largest possible error in the value for the temperature from the now determined values of the unknown parameters in the radiance/wavelength function.

DESCRIPTION OF THE PREFERRED EMBODIMENT

The preferred embodiment contains two devices: a detector and a computer. The detector, in turn, includes a spectrograph and a series of photodetectors.

Figure 1:
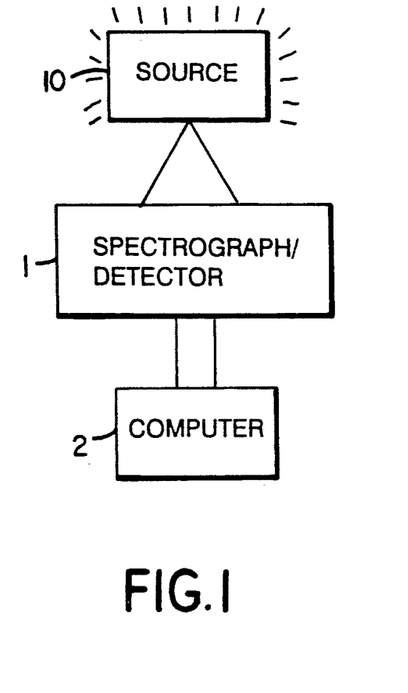
FIG. 1 is a schematic representation of the apparatus configuration of the preferred embodiment, wherein the self-filtering spectrograph/detector apparatus is shown connected to the computer.
Figure 2:
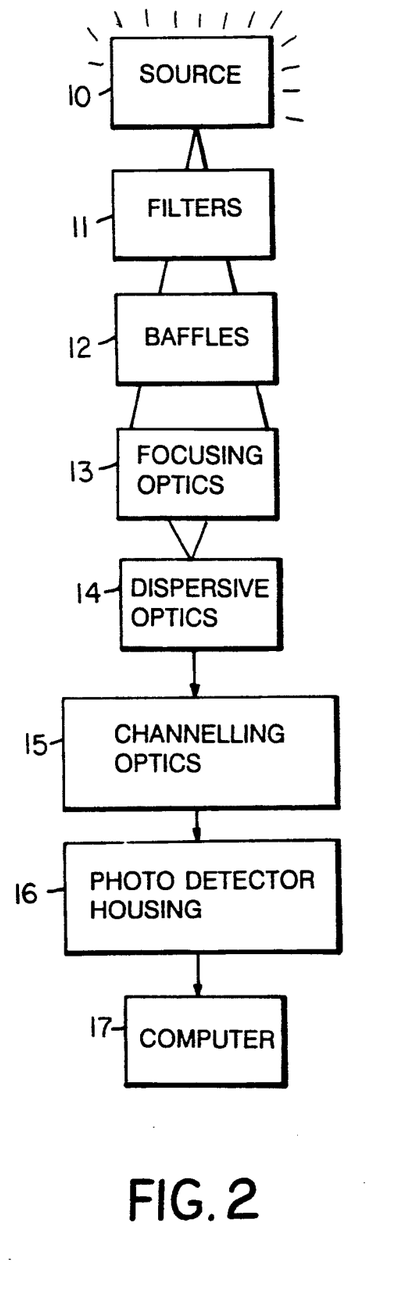
FIG. 2 is a schematic representation of the baffle/filter apparatus, operatively connected to the detector, which comprises a spectrograph and a photodetector housing. The detector is further shown connected to the computer.

The apparatus configuration of the preferred embodiment is represented in FIG. 1. A Photo-Research Spectra Scan PR-700 PC ® or similar equipment is used as the spectrograph/detector (01). This device automatically filters out undesirable light and converts the incoming radiances into electronic radiance signals usable by the computer (02). FIG. 2 demonstrates the configuration of an alternative embodiment wherein the baffle/filter apparatus is operatively connected to a non-self-filtering spectrograph. Spectral radiance emissions emanate from the source object (10). These are then passed through limiting optical filters (11) and baffles (12) to scatter and eliminate undesirable wavelengths of light. A number of filters and baffles may be included and arranged in any order. The radiances then pass through focusing optics (13) of either reflective or refractive form. The focused beam then passes through dispersive optics (14). These can take the forms of either reflective optics (i.e., a spectrograph), or transmissive (i.e., narrow band filters). The beam may then be passed (though it is optional) through channeling optics (15) into the photodetector housing (16), inside of which are the photosensitive detectors. Lastly, the photodetectors convert the radiances into electronic radiance signals, which are conveyed to the computer (17) for processing.

Figure 3:
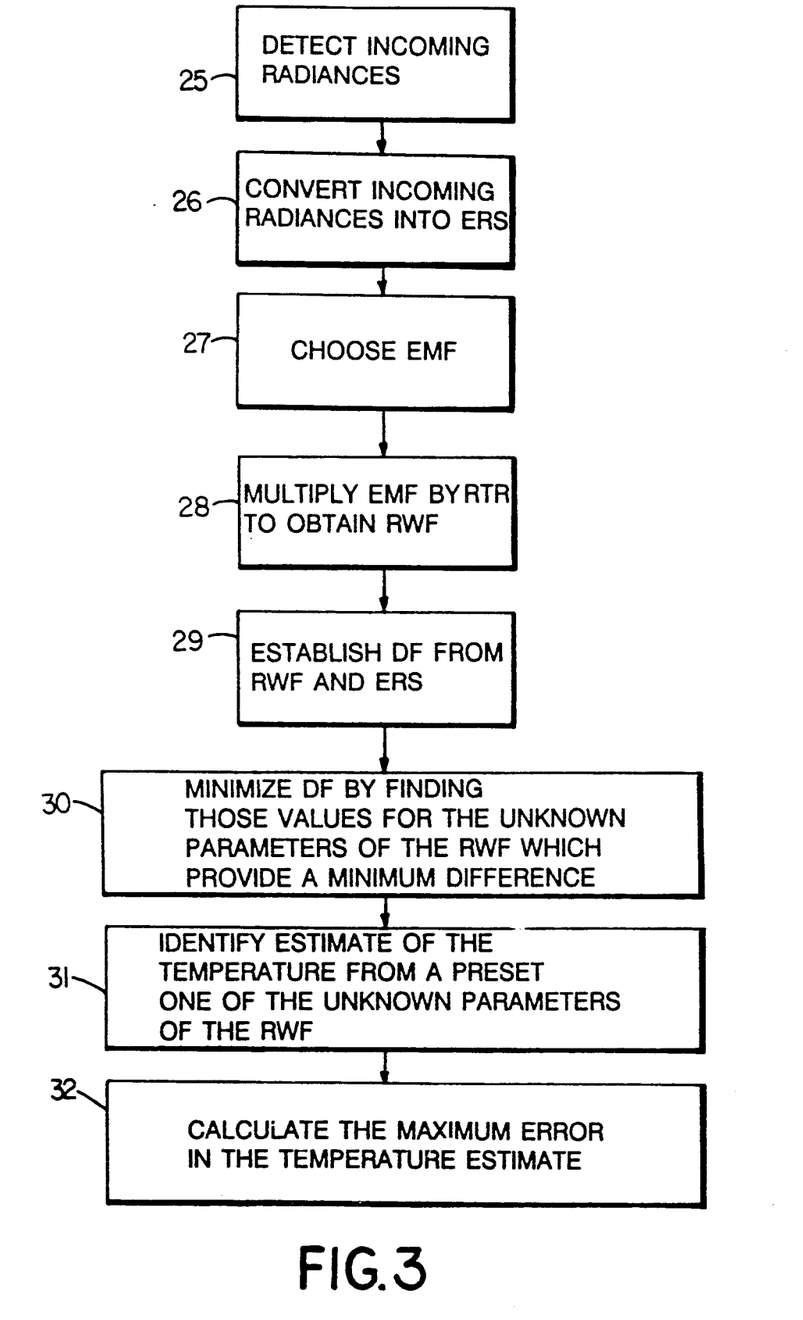
FIG. 3 is a flow-chart, demonstrating the steps by which this invention determines the estimate of the temperature along with the largest possible error in the temperature determination.

FIG. 3 is a flow-chart describing the steps by which the preferred embodiment estimates the temperature of the source object from the spectral radiance it emits. Steps 25 and 26 are performed by the spectrograph in the preferred embodiment, and the baffle/filter apparatus in conjunction with the spectrograph in the alternate embodiment. Steps 27 through 32 are performed by the computer.

After the computer receives the electronic radiance signals (ERS), an appropriate emissivity model function (EMF) must be chosen (27). By the various embodiments, this function may be supplied to the computer by the user, or the user may select the function from a bank of functions predetermined within the computer, or the computer itself may be programmed to select the function from the bank. After the function has been chosen, the computer multiplies the EMF by the radiance/temperature relation (RTR), which for non-linear least-squares analysis is the Planck Radiance Formula, while for linear analysis the RTR is the Wien Approximation to the Plank Radiance Formula. The multiplication results in the Radiance/Wavelength Function (RWF) (28).

The EMF has a functional form of dependence on the wavelength, with unknown parameters as coefficients. The EMF can assume many different forms. Examples of the form might be linear, exponential, quadratic, or a Fourier series in the wavelength. Since the wavelength values will be known by the computer, effectively it is these unknown parameters which are the unknown variables in the function. Thus, for the EMF $$EMF = \epsilon(a_0, a_1, \ldots, a_{m-1})$$

where $\epsilon$ is the emissivity, and the $a$'s are the unknown parameters. This leads to $$N_i = \epsilon(\lambda_i, a_0, a_1, \ldots, a_{m-1}) C_1 \lambda_i^{-5} \exp(-C_2/\lambda_i T),$$

where $N_i$ is defined as the theoretical value of the radiance at the ith wavelength, as predicted by the radiance/wavelength function; $\lambda_i$ is the value of the ith wavelength band; T is the temperature; the $a$'s are the unknown parameters; and $C_1$ and $C_2$ are the Planck Radiation constants.

The computer then establishes a difference function (DF), formed as the difference between the RWF and the input ERS values from the detector (29):

$$\chi^2 = \frac{1}{2} \sum_{i=1}^{n} [N_i(\lambda_i, a_0, \ldots a_{m-1}) - f_i]^2 d\lambda_i$$

where n is defined as the total number of wavelength bands at which measurements of the radiance of the object were taken; m is the total number of unknown parameters; $f_i$ is the measured value of the radiance at the ith wavelength band (i.e., the ERS corresponding to the ith wavelength); and $d\lambda_i$ is the uncertainty in the value of the ith wavelength (i.e. the width of the band).

After establishing the DF, the computer is programmed to curve-fit the RWF to the ERS by finding those values for the unknown parameters, $a_0, \ldots, a_{m-1}$, which minimize the DF (30). At this point, the user may have an option. If the EMF chosen was a linear exponential function of the wavelength, the user may opt for the faster, though less flexible, linear least-squares method of curve-fitting. Otherwise, the non-linear method is used. Both of these methods are now described.

I

Linear Least-Squares Method

The linear least-squares method uses linear algebra techniques to solve for the values of the unknown parameters. Consider the problem of fitting some data $(b_1, b_2, \ldots, b_n)$ to a polynomial of degree m. If $n > m$, we say that the problem is "overdetermined". If, for example, $n = 3$ and $m = 1$ then we will have to solve the following system of equations $$a_0 + a_1 Y_1 = b_1$$
$$a_0 + a_1 Y_2 = b_2$$
$$a_0 + a_1 Y_3 = b_3$$

Here, the unknown parameters are the $a_i$ coefficients; because the equations are linear with respect to these parameters, we can derive the following equations. The overspecified system of equations is inconsistent and in general has no solution. One can get around this problem by defining an error function (E) and then minimizing it; more precisely, we will minimize the square root of the sum of the squares of the error.

$$E = SQRT[(a_0 + a_1 Y_1 - b_1)^2 + (a_0 + a_1 Y_2 - b_2)^2 + (a_0 + a_1 Y_3 - b_3)^2]$$

or in matrix form:

$$E = ||AX - B||_2$$

where $$A = \begin{matrix} 1 & y_1 \\ 1 & y_2 \\ 1 & y_3 \end{matrix}$$

$$x = \begin{matrix} a_0 \\ a_1 \end{matrix}$$

$$B = \begin{matrix} b_1 \\ b_2 \\ b_3 \end{matrix}$$

and so $$E^2 = ||AX - B||_2^2 = \sum_{i=1}^{n} \sum_{j=0}^{m} (a_j y_i - b_i)^2.$$

The minimum of $E^2$ will be found by solving the system of equations $$\frac{\partial E^2}{\partial a_j} = 0,$$

and in matrix form:

$$A^T A X - A^T B = 0$$

In general the method of Least Squares involves finding the minimum of $||AX - B||$. Thus, $$\rho = ||AX - B||$$

and at the minimum $$\rho_{LS} = ||AX_{LS} - B||.$$

From trigonometry, we can define $$\sin\theta = \frac{\rho_{LS}}{||B||}$$

$$\cos\theta = \frac{||AX - B||}{||B||}$$

Then it can be shown that in the worst case $$\frac{||\delta X||}{||X||} \leq u_B(X) \cdot \frac{||\delta B||}{||B||} \quad (1)$$

$$\frac{||\delta X||}{||X||} \leq u_A(X) \cdot \frac{||\delta A||}{||A||} \quad (2)$$

where $u_s(t)$ is called the "condition number" of t with respect to s, and $$u_B(X) = \frac{u(A)}{\cos\theta}, \quad (3)$$

$$u_a(X) = u^2(A)\tan\theta, \; u(A) = ||A|| \cdot ||A^+|| = \sigma_1/\sigma_n \quad (4)$$

$A^+$ = Pseudo-Inverse of A,
$\sigma_1$ = Largest Singular Value of A,
$\sigma_n$ = Smallest Singular Value of A.

Equations (1) and (2) describe the effects of perturbations in the data B and the coefficient matrix A on the solution X. In the simplest terms the condition numbers can be thought of as amplification factors for the translation of a perturbation in B or A on to a perturbation in $X_{LS}$. Whereas $\theta$ is a measure of how closely the equations AX can match the data B.

For the case being discussed here, perturbations in B would arise from noise in the measured data. Perturbations in A would be caused primarily by roundoff error during the LS calculations and would not be very significant unless A was terribly conditioned (i.e. had a very large condition number).

So far we have made no mention of the number of data points n that we are dealing with. In general the actual condition number for perturbations in the data is lower by an approximate multiple of $n^{-\frac{1}{2}}$, i.e., $$u_b(X) \sim \frac{1}{n^{\frac{1}{2}}} \frac{u(A)}{\cos\theta},$$

It should be kept in mind that this is only an order of magnitude approximation.

The measured data ($f_i$) for Multiwavelength Pyrometry (assuming perfect measurements) is the product of two functions:

$$f_i = \epsilon(\lambda_i) C_1 \lambda_i^{-5} [\exp(C_2/\lambda_i T) - 1]^{-1}$$

where
$\lambda_i$ = ith wavelength,
$\epsilon(\lambda)$ = Emissivity.

In general we do not know much about $\epsilon(\lambda)$, but we can make some simplifying assumptions:

i) $\epsilon(\lambda), \epsilon'(\lambda), \epsilon''''(\lambda)$ are continuous over some sufficiently small $(\lambda_1, \lambda_2)$ ii) $\epsilon(\lambda)$ is single valued over some sufficiently small $(\lambda_1, \lambda_2)$ Given these assumptions we can approximate the emissivity with any suitable analytic function such as a polynomial in $\lambda$ or an exponential raised to a polynomial in $\lambda$. This function f is to be modeled by a fitting function g. At this point, however, f is nonlinear in at least one of the unknowns, the temperature T. So we rearrange it, after making the Wien approximation, to get $$\ln(C_1^{-1} f_i \lambda_i^5) = \ln \epsilon - C_2 \lambda_i^{-1} T^{-1}$$

All the quantities on the left side of this equation are known and on the right side the unknowns are $\epsilon$ and temperature. If we define $$g = \ln\left[\exp\left(\sum_{i=0}^{m-2} a_i \lambda^i\right)\right] - a_{m-1} \lambda^{-1}, \; a_{m-1} = C_2/T$$

the emissivity is then modeled by $$\epsilon = \exp\left(\sum_{i=0}^{m-2} a_i \lambda^i\right)$$

and the unknown parameters are the $m-1$ coefficients $(a_0, a_1, \ldots, a_{m-2})$ of the $m-2$ degree polynomial and the temperature T. We now have g as a linear function of the unknown parameters.

Translating this into the terms used to describe the linear LS technique we get $$B = \begin{array}{c} N_1 \\ N_2 \\ \cdot \\ \cdot \\ N_n \end{array},$$

where $$N_i = \ln(c_l^{-1} f_i \lambda_i^5).$$

$$X = \begin{array}{c} a_0 \\ a_1 \\ \cdot \\ \cdot \\ (-a_{m-1}) \end{array},$$

$$A = \begin{array}{ccccc} 1 & \lambda_1 & \lambda_1^2 & \ldots & \lambda_1^{m-2} & \lambda_1^{-1} \\ 1 & \lambda_2 & \lambda_2^2 & \ldots & \lambda_2^{m-2} & \lambda_2^{-1} \\ \cdot \\ \cdot \\ \cdot \\ 1 & \lambda_n & \lambda_n^2 & \ldots & \lambda_n^{m-2} & \lambda_n^{-1} \end{array}$$

Using this method, the values of the unknown parameters X can be evaluated. As shown, the value for the temperature is inversely proportional to the value of $a_{m-1}$:

$$T = C_2 / a_{m-1}$$

The error is determined from the condition number and the closeness of fit as determined by $\theta$. The larger the condition number, the more inaccurate the estimate of the temperature will be for a given noise level.

II

Non-Linear Least Squares Method

If the EMF is not a linear exponential function of the wavelength, non-linear least-squares methods are used. The technique is as follows.

Consider the case where one is trying to fit the data f with the function N. From the above $$\chi^2(a_j) = \frac{1}{2} \sum_{i=1}^{n} [N(a_j, \lambda_i) - f_i]^2 d\lambda_i$$

$$(j = 0, 1, \ldots, m - 1)$$

One now wishes to evaluate the parameters $a_j$ at the minimum of $\chi^2$. If N is nonlinear in the $a_j$, then the system of equations resulting from differentiating $\chi^2$ with respect to the $a_j$ will be nonlinear; and linear techniques such as Gaussian elimination, cannot be used to solve this system of equations. One would then have to look for some sort of iterative technique to locate the minimum in $\chi^2$.

The solution technique used here is described by Bevington. The algorithm used is termed the Gradient Expansion algorithm and was first presented by Marquardt. This algorithm searches the surface defined by $\chi^2$ over the m dimensions for a minimum. When $\chi^2$ is large this method follows the gradient of $\chi^2$. As $\chi^2$ gets smaller, the algorithm linearizes $\chi^2$ by a Taylor expansion. Finally when $\chi^2$ is very small the algorithm does a linear fit to the data. How easy this task will be depends upon the shape of the surface defined by $\chi^2$.

To study the behavior of $\chi^2$, we expand it in a Taylor Series around the minimum. We start by defining the following $$\beta = \begin{array}{c} a_0 \\ a_1 \\ \cdot \\ \cdot \\ a_{m-1} \end{array},$$

$\beta'$ = True value of beta.

$$J = \frac{\partial \chi^2}{\partial a_i}$$

$$H = \frac{\partial^2 \chi^2}{\partial a_i \partial a_j}$$

J' = Gradient at $\beta = \beta'$,
H' = Hessian at $\beta = \beta'$, $$\delta \beta = \beta - \beta'.$$

Assuming $\chi^2$ is quadratic in a sufficiently small neighborhood around $\beta = \beta'$, then, expanding $\chi^2$ in a Taylor series, we can write $$\chi^2(\beta) \sim \chi^2(\beta') + J'^T \delta \beta + \tfrac{1}{2} \delta \beta^T H' \delta \beta.$$

If $\beta'$ is an unconstrained minimum and the function N is a reasonable model for the data f, then J = 0 and $\chi^2(\beta') \approx 0$ by definition. The above equation then reduces to $$\chi^2(\beta) \cong \tfrac{1}{2} \delta \beta^T H' \delta \beta.$$

This inequality describes an m dimensional ellipsoid for each value $\nu$ of $\chi^2(\beta)$. The ellipsoids are concentric and centered around $\delta\beta=0$. The ellipsoid of interest covers a volume of uncertainty in the parameter space, i.e., we cannot determine any of the parameters with an error less than L multiplied by the smallest axis of the ellipsoid. The quantity L is a constant on the order of $n^{\frac{1}{2}}$. We can predict L only in order of magnitude terms.

Our interest, however, is more in the magnitude of the largest possible error, i.e. we wish to locate the points on the ellipsoid farthest from the center. Thus we wish to find the vector $\delta\beta$ which maximizes $$\delta\beta^T H \delta\beta = 2\nu.$$

It can be shown, using the method of Lagrange multipliers, that the desired vector is an unnormalized eigenvector of H' with an eigenvalue $\eta$. So, $$\delta\beta^T \delta\beta = 2\nu/\eta.$$

Each one of these eigenvectors forms an axis of the ellipsoid, and so the worst error will lie in the direction corresponding to the eigenvector with the smallest eigenvalue.

$$||\delta\beta|| = [2\nu/\eta_{smallest}]^{\frac{1}{2}}$$

In general, $$||\delta\beta|| \leq [2\nu/\eta_{smallest}]^{\frac{1}{2}}$$

and in particular $$||\delta\beta|| \text{ is of the order of } [2\nu/n\eta_{smallest}]^{\frac{1}{2}}.$$

If the data $f_i$ are measured with an uncertainty $\Delta_i$, then we can tolerate a change of $$1/2 \sum_{i=1}^{n} \Delta_i^2$$

in $\chi^2$ without having any reason to prefer one value of $\delta\beta$ over another as long as they all lie in the region define by $$\nu + 1/2 \sum_{i=1}^{n} \Delta_i^2.$$

This means that the m-dimensional ellipsoid described above is now defined by $$\nu + 1/2 \sum_{i=1}^{n} \Delta_i^2$$

rather than just by $\nu$. So the error in the parameter estimation is now given by $$||\delta\beta|| = \left[\left(2\nu + \sum_{i=1}^{n} \Delta_i^2\right)/\eta_{smallest}\right]^{1/2}.$$

In general, $$||\delta\beta|| \leq \left[\left(2\nu + \sum_{i=1}^{n} \Delta_i^2\right)/\eta_{smallest}\right]^{1/2},$$

and in particular, $$||\delta\beta|| \text{ is of the order of}$$

$$\left[\left(2\nu + \sum_{i=1}^{n} \Delta_i^2\right)/n\eta_{smallest}\right]^{1/2}.$$

Eigenvalue calculations are difficult and sometimes unstable, so we wish to avoid them if possible. Fortunately, for the cases we deal with here, H' is a Hermitian matrix. Hermitian matrices have the property that the singular values are equal to the absolute value of the eigenvalues. Additionally the singular vectors are equal to the eigenvectors if the matrix is positive semidefinite, otherwise, the singular and eigenvectors agree to within a factor of $(-1)^{\frac{1}{2}}$. So, we can write the equation as:

$$||\delta\beta|| \text{ is of the order of}$$

$$\left[\left(2\nu + \sum_{i=1}^{n} \Delta_i^2\right)/n\sigma_{smallest}\right]^{\frac{1}{2}}$$

where $\sigma_{smallest}$ is the smallest singular value of H.

In the non-linear technique, the user is allowed to determine which of the unknown parameters contained in $\beta$ is to serve as the parameter corresponding to the temperature estimate. In turn, the worst possible error, presented in percentage form is $$\text{Error} = \frac{||\delta\beta||}{||\beta||} \times 100\%$$

After the computer has determined the values for the temperature and error, these quantities are displayed to the user.

Other embodiments are within the following claims.

We claim:

1. Apparatus for non-contact temperature measurement of an object, comprising:
   detector apparatus, responsive to radiances of the object at multiple wavelengths, to generate electronic radiance signals corresponding to the detected radiances at each of the multiple wavelengths; wherein the detector apparatus further comprises:
   spectrograph apparatus, responsive to the incoming radiances from the object, adapted to separate the incoming radiances into small wavelength bands; and
   photosensitive devices, one responsive to each of the wavelength bands, to convert incoming radiances into electronic radiance signals, each of the signals of strengths corresponding to the intensity of the incoming radiances at the respective multiple wavelength bands; and computing apparatus, responsive to the electronic radiance signals, the computing apparatus including at least one preselected emissivity model function, with unknown parameters, for the wavelength dependence of the emissivity of the object; wherein the computer apparatus is adapted to:
   multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function;

identify an estimated value of the temperature from a pre-determined one of the unknown parameters of the emissivity model function and radiance/wavelength function; and calculate an estimate of the error in the temperature from now-determined values of the unknown parameters and the difference function, wherein a baffle and filter apparatus is operatively connected to the spectrograph apparatus, eliminating detection of undesirable stray light and undesirable stray wavelength bands of light.

2. Apparatus for non-contact temperature measurement of an object, comprising:

detector apparatus, responsive to radiances of the object at multiple wavelengths, to generate electronic radiance signals corresponding to the detected radiances at each of the multiple wavelengths; and computing apparatus, responsive to the electronic radiance signals, the computing apparatus including at least one pre-selected emissivity model function, with unknown parameters, for the wavelength dependence of the emissivity of the object; wherein the computer apparatus is adapted to:

multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function;

identify an estimated value of the temperature from a pre-determined one of the unknown parameters of the emissivity model function and radiance/wavelength function; and calculate an estimate of the error in the temperature from now-determined values of the unknown parameters and the difference function, wherein the computing apparatus is further adapted so that the pre-selected emissivity model function is input directly by a user.

3. Apparatus for non-contact temperature measurement of an object, comprising:

detector apparatus, responsive to radiances of the object at multiple wavelengths, to generate electronic radiance signals corresponding to the detected radiances at each of the multiple wavelengths; and computing apparatus, responsive to the electronic radiance signals, the computing apparatus including at least one pre-selected emissivity model function, with unknown parameters, for the wavelength dependence of the emissivity of the object; wherein the computer apparatus is adapted to:

multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function:

identify an estimated value of the temperature from a pre-determined one of the unknown parameters of the emissivity model function and radiance/wavelength function; and calculate an estimate of the error in the temperature from now-determined values of the unknown parameters and the difference function, wherein the computing apparatus is further adapted so that a user selects the pre-selected emissivity model function from a bank of potential emissivity model functions, included in the computing apparatus.

4. Apparatus for non-contact temperature measurement of an object, comprising:

detector apparatus, responsive to radiances of the object at multiple wavelengths, to generate electronic radiance signals corresponding to the detected radiances at each of the multiple wavelengths; and computing apparatus, responsive to the electronic radiance signals, the computing apparatus including at least one pre-selected emissivity model function, with unknown parameters, for the wavelength dependence of the emissivity of the object; wherein the computer apparatus is adapted to:

multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function;

identify an estimated value of the temperature from a pre-determined one of the unknown parameters of the emissivity model function and radiance/wavelength function; and calculate an estimate of the error in the temperature from now-determined values of the unknown parameters and the difference function, wherein the computing apparatus is further adapted to include a bank of potential emissivity model functions, and further adapted to select the appropriate emissivity model function from the bank.

5. Apparatus for non-contact temperature measurement of an object, comprising:

detector apparatus, responsive to radiances of the object at multiple wavelengths, to generate electronic radiance signals corresponding to the detected radiances at each of the multiple wavelengths; and computing apparatus, responsive to the electronic radiance signals, the computing apparatus including at least one pre-selected emissivity model function, with unknown parameters, for the wavelength dependence of the emissivity of the object; wherein the computer apparatus is adapted to:

multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function;

identify an estimated value of the temperature from a pre-determined one of the unknown parameters of the emissivity model function and radiance/wavelength function; and calculate an estimate of the error in the temperature from now-determined values of the unknown parameters and the difference function, wherein the radiance/temperature relation is the Planck Radiance Formula, and wherein the computing apparatus is adapted so that the emissivity model function, $\epsilon(\lambda)$, is multiplied by the Planck Radiance Formula, which is:

$$N = C_1 \lambda^{-5} [exp(C_2/\lambda T) - 1]^{-1}$$

where: N is defined as the radiance of a blackbody object, $\lambda$ is defined as the wavelength of emitted radiance, T is defined as the absolute temperature of a blackbody object, $C_1$, $C_2$ are defined as the Planck radiation constants; the multiplication to provide a formula for the radiance of a real body rather than a blackbody, this formula known as the radiance/wavelength function; hence, $$N(\lambda) = \epsilon(\lambda) C_1 \lambda^{-5} [exp(C_2/\lambda T) - 1]^{-1},$$

wherein N is now the radiance of a real body (i.e., the object); and wherein the difference function is a least squares function, wherein the least squares function is:

$$\chi^2 = \tfrac{1}{2} \sum_{i=1}^{n} (N_i - f_i)^2 d\lambda_i,$$

where:

n is defined as the total number of the multiple wavelengths at which the radiance of the object is measured;

$f_i$ is defined as the ith measurement of the radiance of the object (i = 1, ..., n);

$N_i$ is defined as the theoretical value of the radiance at the ith wavelength, as predicted by the radiance/wavelength function;

$d\lambda_i$ is defined as the uncertainty in the value of the ith wavelength.

6. Apparatus of claim 5, wherein the computing apparatus is further adapted to minimize the least squares function, $\chi^2$, by finding those values of unknown parameters, $a_0, \ldots, a_{m-1}$, of the emissivity model function, $\epsilon(\lambda)$, and the radiance/wavelength function, such that $$\chi^2(a_0, a_1, \ldots, a_{m-1}) = \tfrac{1}{2} \sum_{i=1}^{n} [N_i(a_0, a_1, \ldots, a_{m-1}) - f_i]^2 d\lambda_i$$

is a minimum.

7. Apparatus of claim 6, wherein the radiance/temperature relation is the Wien Approximation to the Planck Radiance Formula, and wherein the computing apparatus is adapted to minimize the least squares function, $\chi^2$, using linear least squares curve-fitting.

8. Apparatus of claim 6, wherein the computing apparatus is adapted to minimize the least squares function, $\chi^2$, using non-linear least squares curve fitting.

9. Apparatus of claim 7, wherein the value for the temperature is related inversely to the value of the last of the unknown parameters, $a_{m-1}$, by the relation:

$$T = C_2/a_{m-1}.$$

10. Apparatus of claim 8, wherein the temperature is related to one of the unknown parameters, as pre-selected, the relation depending upon the particular one of the unknown parameters pre-selected, and the form of the non-linear emissivity model function chosen.

11. Apparatus of claims 9 or 10, wherein the computer apparatus is further adapted to determine an estimate of the error in the value for the temperature, the estimate of error relating to the differences between true and estimated values of the temperature and the other unknown parameters.

12. A method for non-contact temperature measurement of an object, comprising:

detection of radiances of the object to generate electronic radiance signals corresponding to the detected radiances at each of the multiple wavelengths; wherein the detection of the radiances is accomplished by a detector apparatus, comprising, separating the incoming radiances into suitably small wavelength bands using a spectrograph apparatus responsive to the incoming radiances from the object; and converting the incoming radiances from the spectrograph apparatus, using photodiode devices for each wavelength band, into electronic radiant signals, each of the signals of strengths corresponding to the intensity of the incoming radiances at the respective multiple wavelength bands;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function; minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function, wherein the detection of the incoming radiances is further aided by a baffle and filter apparatus, operatively connected to the spectrograph apparatus, to eliminate detection of undesirable stray light and undesirable stray wavelength bands of light.

13. A method for non-contact temperature measurement of an object, comprising:

detection of radiances of the object to generate electronic radiance signals corresponding to the detected radiances at each of the multiple wavelengths;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function; minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function, wherein the operating on the electronic radiance signals is facilitated by adapting the computing apparatus so that the pre-selected emissivity model function is input directly by a user.

14. A method for non-contact temperature measurement of an object, comprising:

detection of radiances of the object to generate electronic radiance signals corresponding to the detected radiances at each of the multiple wavelengths;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function; minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function, wherein operating on the electronic radiance signals is facilitated by the computer apparatus being adapted so as to include a bank of potential emissivity model functions, from which a user selects the pre-selected emissivity model function to be used by the computing apparatus.

15. A method for non-contact temperature measurement of an object, comprising:

detection of radiances of the object to generate electronic radiance signals corresponding to the detected radiances at each of the multiple wavelengths;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function;

minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function, wherein operating on the electronic radiance signals is facilitated by the computer apparatus being adapted to include a bank of potential emissivity model functions, the computer apparatus further adapted to select the appropriate emissivity model function from the bank.

16. A method for non-contact temperature measurement of an object, comprising:

detection of radiances of the object to generate electronic radiance signals corresponding to the detected radiances at each of the multiple wavelengths;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function;

minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function, wherein the radiance/temperature relation is the Planck Radiance Formula, and wherein the computing apparatus is adapted to multiply the emissivity model function, $\epsilon(\lambda)$, by the Planck Radiance Formula, which is:

$$N = C_1 \lambda^{-5} [exp(C_2/\lambda T) - 1]^{-1}$$

where:

N is defined as the radiance of a blackbody object,

λ is defined as the wavelength of emitted radiance,

T is defined as the absolute temperature of a blackbody object, $C_1$, $C_2$ are defined as the Planck radiation constants; the multiplication to provide a formula for the radiance of a real body rather than a blackbody, this formula known as the radiance/wavelength function; hence, $$N(\lambda) = \epsilon(\lambda) C_1 \lambda^{-5} [exp(C_2/\lambda T) - 1]^{-1}$$

where N is now the radiance of a real body (i.e., the object); and wherein the difference function is a least squares function, wherein the least squares function is:

$$\chi^2 = 1/2 \sum_{i=1}^{n} (N_i - f_i)^2 d\lambda_i,$$

where: n is defined as the total number of the multiple wavelengths at which the radiance of the object is measured;

$f_i$ is defined as the ith measurement of the radiance of the object (i=1, ..., n);

$N_i$ is defined as the theoretical value of the radiance at the ith wavelength, as predicted by the radiance/wavelength function;

$d\lambda_i$ is defined as the uncertainty in the value of the ith wavelength.

17. Method of claim 16, wherein the computing apparatus is further adapted to minimize the least squares function, $\chi^2$, by finding those values of unknown parameters, $a_0, \ldots, a_{m-1}$, of the emissivity model function, $\epsilon(\lambda)$, and the radiance/wavelength function, such that $$\chi(a_0, a_1, \ldots, a_{m-1}) = 1/2 \sum_{i=1}^{n} [N_i(a_0, a_1, \ldots, a_{m-1}) - f_i]^2 d\lambda_i$$

is a minimum.

18. Method of claim 17, wherein the radiance/temperature relation is the Wien Approximation to the Planck Radiance Formula, and wherein the computing apparatus is adapted to minimize the least squares function, $\chi^2$, using linear least squares curve-fitting.

19. Method of claim 17, wherein the computing apparatus is adapted to minimize the least squares function, $\chi^2$, using non-linear least squares curve fitting.

20. Method of claim 18, wherein the value for the temperature is related inversely to the value of the last of the unknown parameters, $a_{m-1}$, by the relation:

$$T = C_2/a_{m-1}.$$

21. Method of claim 19, wherein the temperature is related to one of the unknown parameters, as pre-selected, the relation depending upon the particular one of the unknown parameters pre-selected, and the form of the non-linear emissivity model function chosen.

22. Method of claims 20 or 21, wherein the computing apparatus is further adapted to determine an estimate of the error in the value for the temperature, the estimate of error relating to the differences between true and estimated values of the temperature and the other unknown parameters.

23. Apparatus for non-contact temperature measurement of an object, comprising:

detector apparatus, responsive to radiances of the object at multiple wavelengths, to generate electronic radiance signals corresponding to the detected radiances at each of the multiple wavelengths; and computing apparatus, responsive to the electronic radiance signals, the computing apparatus including at least one pre-selected emissivity model function, with unknown parameters, for the wavelength dependence of the emissivity of the object; wherein the computer apparatus is adapted to:

multiply the emissivity model function by a radiance/temperature relation to generate a radiance/wavelength function;

minimize a difference function, related to the difference between the detected electronic radiance signals and the respective radiance values predicted by the radiance/wavelength function, by finding the values for the unknown parameters in the radiance/wavelength function which minimize the difference function;

identify an estimated value of the temperature from a pre-determined one of the unknown parameters of the emissivity model function and radiance/wavelength function; and calculate an estimate of the error in the temperature from now-determined values of the unknown parameters and the difference function, wherein the radiance/temperature relation is the Wien Approximation to the Planck Radiance Formula, and wherein the computing apparatus is adapted so that the emissivity model function, $\epsilon(\lambda)$, is multiplied by the Wien Approximation to the Planck Radiance Formula, which is:

$$N = \frac{C_1}{\lambda^5 exp(C_2/\lambda T)} = C_1 \lambda^{-5} exp(-C_2/\lambda T);$$

where:

N is defined as the radiance of a blackbody object,

λ is defined as the wavelength of emitted radiance,

T is defined as the absolute temperature of a blackbody object, $C_1$, $C_2$ are defined as the Planck radiation constants; the multiplication to provide a formula for the radiance of a real body rather than a blackbody, this formula known as the radiance/wavelength function; hence, $$N(\lambda) = \epsilon(\lambda) C_1 \lambda^{-5} exp(-C_2/\lambda T)$$

where N is now the radiance of a real body (i.e., the object); and wherein the difference function is a least squares function, wherein the least squares function is:

$$\chi^2 = 1/2 \sum_{i=1}^{n} (N_i - f_i)^2 d\lambda_i,$$

where:

n is defined as the total number of the multiple wavelengths at which the radiance of the object is measured, $f_i$ is defined as the ith measurement of the radiance of the object (i=1, ..., n);

$N_i$ is defined as the theoretical value of the radiance at the ith wavelength, as predicted by the radiance/wavelength function;

$d\lambda_i$ is defined as the uncertainty in the value of the ith wavelength.

24. Apparatus of claim 23, wherein the computing apparatus is further adapted to minimize the least squares function, $\chi^2$, by finding those values of unknown parameters, $a_0, \ldots, a_{m-1}$, of the emissivity model function, $\epsilon(\lambda)$, and the radiance/wavelength function, such that $$\chi(a_0, a_1, \ldots, a_{m-1}) = 1/2 \sum_{i=1}^{n} [N_i(a_0, a_1, \ldots, a_{m-1}) - f_i]^2 d\lambda_i$$

is a minimum.

25. Apparatus of claim 24, wherein the computing apparatus is adapted to minimize the least squares function, $\chi^2$, using linear least squares curve-fitting.

26. Apparatus of claim 24, wherein the radiance/temperature relation is the Planck Radiance Formula, and wherein the computing apparatus is adapted to minimize the least squares function, $\chi^2$, using non-linear least squares curve fitting.

27. Apparatus of claim 25, wherein the value for the temperature is related inversely to the value of the last of the unknown parameters, $a_{m-1}$, by the relation: $T = C_2/a_{m-1}$.

28. Apparatus of claim 26, wherein the temperature is related to one of the unknown parameters, as pre-selected, the relation depending upon the particular one of the unknown parameters pre-selected, and the form of the non-linear emissivity model function chosen.

29. Apparatus of claims 27 or 28, wherein the computer apparatus is further adapted to determine an estimate of the error in the value for the temperature, the estimate of error relating to the differences between true and estimated values of the temperature and the other unknown parameters.

30. A method for non-contact temperature measurement of an object, comprising:

detection of radiances of the object to generate electronic radiance signals corresponding to the detected radiances at each of the multiple wavelengths;

and operating on the electronic radiance signals, using a computing apparatus, the computing apparatus adapted to include at least one pre-selected emissivity model function, with unknown parameters, for the wavelength dependence of the emissivity of the object, the operations comprising:

multiplication of the emissivity model function by a radiance/temperature relation to generate a radiance/wavelength function;

minimization of a difference function, related to the difference between the detected electronic radiance signals and the respective radiance values predicted by the radiance/wavelength function, by finding the values for the unknown parameters in the radiance/wavelength function which minimize the difference function;

identification of an estimated value of the temperature from a pre-determined one of the unknown parameters of the emissivity model function and the radiance/wavelength function; and calculation of an estimate of the error in the temperature from now-determined values of the unknown parameters and the difference function; wherein the radiance/temperature relation is the Wien Approximation to the Planck Radiance Formula, and wherein the computing apparatus is adapted to multiply the emissivity model function, $\epsilon(\lambda)$, by the Wien Approximation to the Planck Radiance Formula, which is:

$$N = \frac{C_1}{\lambda^5 \exp(C_2/\lambda T)} = C_1 \lambda^{-5} \exp(-C_2/\lambda T);$$

where:

N is defined as the radiance of a blackbody object, $\lambda$ is defined as the wavelength of emitted radiance, T is defined as the absolute temperature of a blackbody object, $C_1$, $C_2$ are defined as the Planck radiation constants; the multiplication to provide a formula for the radiance of a real body rather than a blackbody, this formula known as the radiance/wavelength function; hence, $$N(\lambda) = \epsilon(\lambda) C_1 \lambda^{-5} \exp(-C_2/\lambda T),$$

where N is now the radiance of a real body (i.e., the object); and wherein the difference function is a least squares function, wherein the least squares function is:

$$\chi^2 = 1/2 \sum_{i=1}^{n} (N_i - f_i)^2 d\lambda_i,$$

where:

n is defined as the total number of the multiple wavelengths at which the radiance of the object is measured;

$f_i$ is defined as the ith measurement of the radiance of the object (i=1, ..., n);

$N_i$ is defined as the theoretical value of the radiance at the ith wavelength, as predicted by the radiance/wavelength function;

$d\lambda_i$ is defined as the uncertainty in the value of the ith wavelength.

31. Method of claim 30, wherein the computing apparatus is further adapted to minimize the least squares function, $\chi^2$, by finding those values of unknown parameters, $a_0, \ldots, a_{m-1}$, of the emissivity model function, $\epsilon(\lambda)$, and the radiance/wavelength function, such that $$\chi(a_0, a_1, \ldots, a_{m-1}) = 1/2 \sum_{i=1}^{n} [N_i(a_0, a_1, \ldots, a_{m-1}) - f_i]^2 d\lambda_i$$

is a minimum.

32. Method of claim 31, wherein the computing apparatus is adapted to minimize the least squares function, $\chi^2$, using linear least squares curve-fitting.

33. Method of claim 31, wherein the radiance/temperature relation is the Planck Radiance Formula, and wherein the computing apparatus is adapted to minimize the least squares function, $\chi^2$, using non-linear least squares curve fitting.

34. Method of claim 32, wherein the value for the temperature is related inversely to the value of the last of the unknown parameters, $a_{m-1}$, by the relation:

$$T = C_2/a_{m-1}.$$

35. Method of claim 33, wherein the temperature is related to one of the unknown parameters, as pre-selected, the relation depending upon the particular one of the unknown parameters pre-selected, and the form of the non-linear emissivity model function chosen.

36. Method of claim 34 or 35, wherein the computing apparatus is further adapted to determine an estimate of the error in the value for the temperature, the estimate of error relating to the differences between true and estimated values of the temperature and the other unknown parameters.

* * * * *

UNITED STATES PATENT AND TRADEMARK OFFICE
CERTIFICATE OF CORRECTION

PATENT NO.   : 5,132,922

DATED        : July 21, 1992

INVENTOR(S)  : Mansoor A. Khan, Charly Allemand, and Thomas W. Eagar

It is certified that error appears in the above-identified patent and that said Letters Patent is hereby corrected as shown below:

Column 5, line 50, "$y_i$" should be --$(y_i)^j$--.

Signed and Sealed this

Seventh Day of September, 1993

*Attest:*

BRUCE LEHMAN

*Attesting Officer*   Commissioner of Patents and Trademarks